(12) United States Patent
Dittmer et al.

(10) Patent No.: US 8,348,512 B2
(45) Date of Patent: Jan. 8, 2013

(54) CLUTCH RELEASE BEARING AND METHOD FOR THE PRODUCTION THEREOF

(75) Inventors: Steffen Dittmer, Aurachtal (DE); Bernhard Kloepfer, Bad Windsheim (DE); Ludwig Winkelmann, Erlangen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 12/932,213

(22) Filed: Feb. 18, 2011

(65) Prior Publication Data

US 2011/0206311 A1 Aug. 25, 2011

Related U.S. Application Data

(63) Continuation of application No. PCT/EP2009/059737, filed on Jul. 28, 2009.

(30) Foreign Application Priority Data

Aug. 23, 2008 (DE) .......................... 10 2008 039 489

(51) Int. Cl.
*F16C 33/76* (2006.01)
*B21D 53/10* (2006.01)

(52) U.S. Cl. ...... 384/477; 384/484; 384/607; 29/898.11

(58) Field of Classification Search .................. 384/477, 384/484–486, 489, 563–564, 569, 611, 617, 384/607; 192/98, 85.54, 85.57; 29/898.07, 29/898.11

See application file for complete search history.

(56) References Cited

U.S. PATENT DOCUMENTS

| 3,519,316 | A | * | 7/1970 | Gothberg | 384/486 |
| 3,921,775 | A | * | 11/1975 | Matyschik | 192/98 |
| 4,608,741 | A | * | 9/1986 | Mallet | 384/611 |
| 4,815,867 | A | * | 3/1989 | Ladin | 384/617 |
| 5,113,988 | A | * | 5/1992 | Caron | 192/98 |
| 5,287,951 | A | * | 2/1994 | Voit et al. | 192/98 |
| 5,887,984 | A | * | 3/1999 | Duval | 384/477 |
| 6,464,060 | B1 | * | 10/2002 | Ponson et al. | 192/98 |
| 6,684,997 | B2 | * | 2/2004 | Klopfer et al. | 192/98 |
| 6,811,013 | B2 | * | 11/2004 | Dittmer et al. | 192/98 |
| 7,117,986 | B2 | * | 10/2006 | Thomire et al. | 192/98 |

FOREIGN PATENT DOCUMENTS

| DE | 43 38 261 B4 | 5/1994 |
| DE | 19709056 A1 * | 9/1998 |
| DE | 6 96 18 149 T2 | 8/2002 |
| DE | 10 2005 053 612 A1 | 5/2007 |
| EP | 0773384 A1 | 5/1997 |
| EP | 0942188 A2 | 9/1999 |

(Continued)

OTHER PUBLICATIONS

EPO website translation of DE 10 2005 053 612 A1, 11 pages.

*Primary Examiner* — Marcus Charles
(74) *Attorney, Agent, or Firm* — Davidson, Davidson & Kappel, LLC

(57) ABSTRACT

A clutch release bearing device having an interior and an exterior raceway. The exterior raceway is equipped with a ring wall being retracted underneath the path radius of an inner roller body raceway. An interior sealing device is provided, including a ring element axially supported on an inner radial wall section of the retracted ring wall.

11 Claims, 8 Drawing Sheets

FOREIGN PATENT DOCUMENTS

| | | | |
|---|---|---|---|
| FR | 2661470 A1 | * | 10/1991 |
| GB | 1405562 | | 9/1975 |
| JP | 11223226 A | * | 9/1999 |
| JP | 11280789 A | * | 10/1999 |
| JP | 2006009932 A | * | 1/2006 |
| JP | 2006194307 A | * | 7/2006 |

* cited by examiner

US 8,348,512 B2

CLUTCH RELEASE BEARING AND METHOD FOR THE PRODUCTION THEREOF

CROSS-REFERENCE TO RELATED APPLICATIONS

This is a continuation of prior International Application PCT/EP2009/059737, filed Jul. 28, 2009, which claims priority to German Patent Application DE 10 2008 039 489.0, filed Aug. 23, 2008, the entire disclosures of which are hereby incorporated by reference herein.

FIELD OF THE INVENTION

The invention relates to a clutch release bearing device with a first bearing race that forms the internal bearing race and thus the driven bearing race, a second bearing race that forms the external bearing race, and attached to an actuation mechanism via a radially drawn-in ring wall, rolling bodies that are contained in a space defined between both the bearing races and a cage for guiding said rolling bodies within said raceway. Particularly, the invention relates herewith to a clutch release bearing device that withstands high running loads even under inconvenient surrounding conditions, particularly in dusty surroundings. Furthermore, the invention is based also on a method for the production of the drawn-in ring wall, particularly a designed clutch release bearing device formed on the second bearing race.

BACKGROUND

A clutch release bearing device of the aforementioned type is known from DE 6 96 18 149 T2 where a sealing ring is fitted in an internal edge section formed by the external race equipped with an elastomeric sealing lip. This sealing lip lies on a surface provided on the internal bearing race and therefore seals the internal roller bearing cavity on one side.

From DE 43 38 261 B4, a clutch release bearing device is also known in which a ring gap formed between the two bearing races is sealed at the rear section of the bearing turned away in the assembly position of the clutch.

SUMMARY OF THE INVENTION

It is an object of the invention to provide a clutch release bearing device that is economically producible, and that is characterized by its ability to resist moisture and dust.

The present invention provides a clutch release bearing device with:

a first bearing race representing the bearing race revolving around a bearing axis, and a first external ring surface rolling member race made as an external ring surface a second bearing race and the second rolling member race formed as an internal ring surface rolling bodies contained in a raceway space defined between the first bearing race and the second bearing race, and a cage guiding the rolling members within the raceway space, whereby the first bearing race and the second bearing race overlap one another in the axial direction and the second bearing race thus surrounds the first bearing race externally the second bearing race is formed as a radial drawn-in ring wall below the radial level of the first rolling member race, and a sealing device is provided to suppress penetration of pollution into the raceway space over a potential passage section formed between the two bearing races whereby this clutch release bearing device is characterized in that the sealing device comprises a ring element that sits on an internal wall section of the radial drawn-in ring wall of the second bearing race In that way, it becomes advantageously possible to create a clutch release bearing device, particularly a CSC-release bearing in which the sealing device is positioned in the axial direction reliably, and very precisely through the internal wall of the ring wall, so that the release bearing is sealed particularly, effectively also in the rear section.

The ring element is formed preferably such that it carries a sealing structure on an adjoining race section of the first bearing race. As an alternatively to, or also in combination with this measure, it is also possible to form the ring element so that it forms a start surface for a sealing lip structure attached to the internal bearing race.

In accordance with a particularly preferred embodiment of the invention, the ring element is made under inclusion of a reinforcing ring, particularly a steel ring that rests on the above-mentioned internal circumferential wall, positioned in axial direction. This reinforcing and/or steel ring can be formed with respect to its profile cross-section so that it axially extends through an internal opening defined by the drawn-in ring wall. The section of the reinforcing steel ring, extending through the internal opening, can be secured by means of other locking structures, particularly by means of latching claws or claw edges.

The ring element according to the invention is formed preferably so that it comprises a sealing lip device manufactured out of an elastomeric material. This sealing lip device can be formed so that it forms several sealing lips, particularly a pair of sealing lips. The sealing lip device is formed preferably so that it lies on a race section formed by an external circumferential surface of the first bearing race. Detail geometries that support the sealing effect and resistance to wear can be realized on the sealing lip devices. Particularly here, it is possible to form spiral grooves that support the grease retaining-effect for a known running direction of the driven bearing race.

Furthermore, it is also possible to form the sealing lip device such that at least one sealing lip slides on a section of the first bearing race formed as a ring face or also as an internal ring surface or at least approaches this surface as much as possible, in order act as a contactless dust seal or as a slightly sliding dust seal.

Alternative to the design of the sealing device or a sealing lip device or also in combination with this measure, it is also possible to equip the sealing device with other elastomeric elements or for example with fleece ring elements as well.

What is characteristic for the clutch release bearing device according to the invention in all embodiment variants is that the sealing device is attached from inside to the drawn-in ring wall and is axially supported on the internal wall section formed by the drawn-in ring wall section of the second bearing race.

The feature on the second bearing race of a radial drawn-in ring wall below the radial level of the first rolling member race section means that the diameter of an internal opening defined by the ring wall is smaller than the diameter of the rolling members' race formed by the first race, i.e. the internal bearing race. The invention is based particularly on this bearing and in this bearing design; it particularly effectively allows the gap remaining between the ring wall and the adjacent section of the internal bearing race. The consideration of the internal surface according to the invention—formed by the ring wall—as seat and axial positioning surface for the sealing ring device allows robust axial support of the sealing ring device and when linking the sealing device—a relatively insensitive assembly approach—since the sealing ring device can be attached with large pressing forces and without monitoring the pressing distance to the second bearing race, without heavily loading delicate sealing device structures.

Through the concept according to the invention, in a special bearing type, already before inserting the internal bearing race, it is possible to assemble all circumferential seals on the second bearing race and thereby create an assembly in which the rolling members including the cage are be received between the front and rear sealing ring in a manner whereby it cannot be lost. This assembly can be provided with grease filling function and is equipped with the internal bearing race only within the scope of the last assembly steps. Hereby, different bearing variants can first be realized advantageously through the final linking of internal bearing races of different bearing variants by reverting to a prefabricated external ring group.

The radially drawn-in ring wall section forms an internal surface section facing the rolling members' raceway space. This internal surface section preferably represents a plane and a ring face formed with respect to the raceway, for the rolling bodies in the second bearing race, under extremely tight positional tolerances. This ring face does not determine the position of a stationary, i.e. non-revolving ring element. The invention herewith comprises the approach to position a flexible sealing structure axially through this non-revolving ring element. The invention further comprises the approach through this non-revolving ring element to provide an axially correctly positioned race that can interact with a driven flexible sealing structure. In both cases, it is characteristic in special bearing type that an internal ring space formed as such between the drawn-in ring wall and the end section of the first bearing race is sealed by a ring. This sealing device comprises at least a sealing component of the axial position through which an inner wall section of the drawn-in ring wall is determined.

The present invention also provides a method for the production of a clutch release bearing device of the present invention wherein within the scope of a step preceding the insertion of internal bearing race into the external bearing race, the second bearing race is equipped with the sealing device in that at least a ring element of the sealing device is fitted, on the internal surface section of the drawn-in ring wall, from the application direction of the internal bearing race.

BRIEF DESCRIPTION OF THE DRAWINGS

Further details and features of the invention are derived from the following description in connection with the drawing. Shown are.

DETAILED DESCRIPTION

Figure 1:
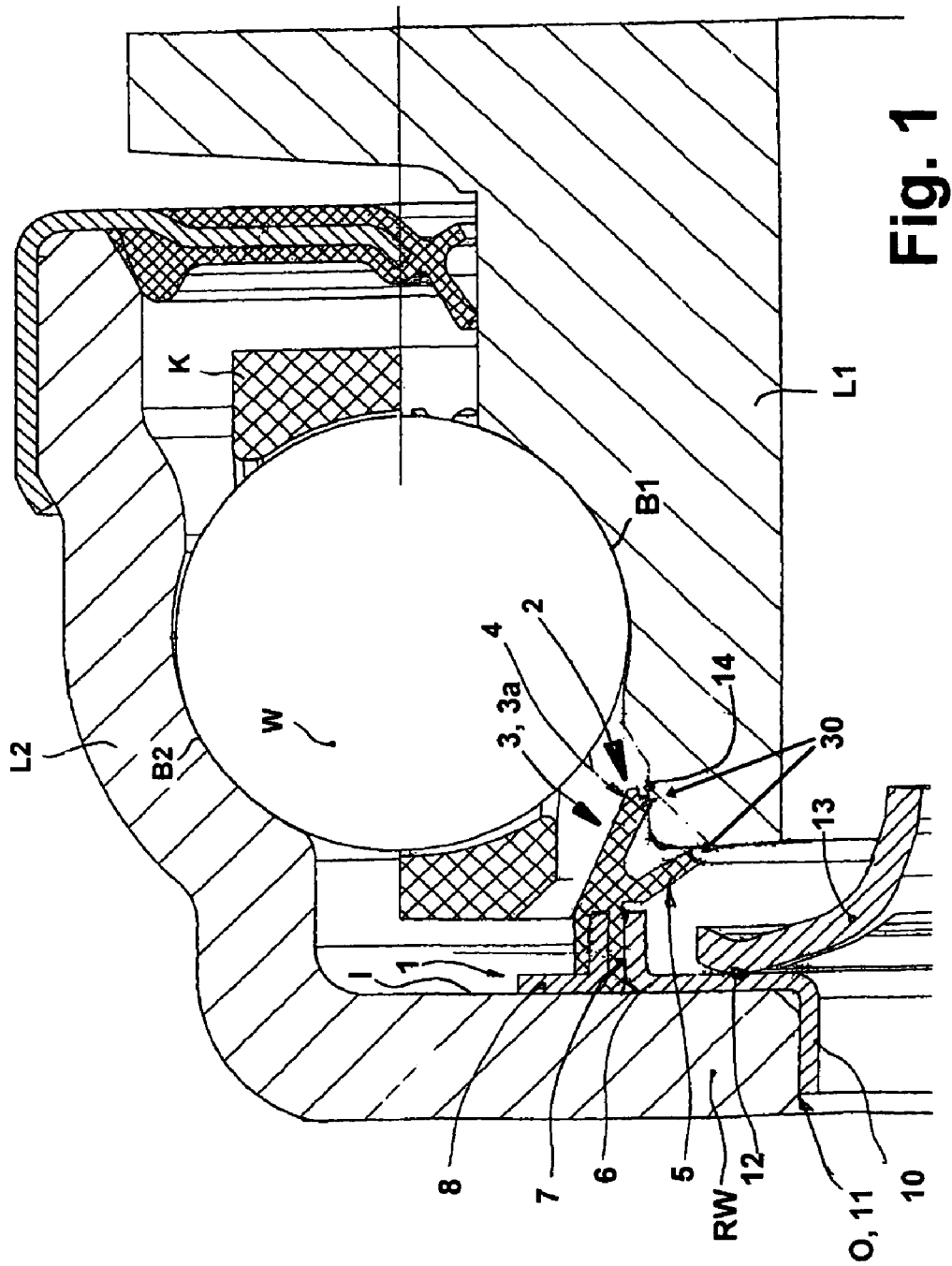
FIG. 1 an axial sectional representation to illustrate the design of a first embodiment of a clutch release bearing device according to the invention, FIG. 2 an axial sectional representation to illustrate a second variant of a clutch release bearing device according to the invention, FIG. 3 an axial sectional representation to illustrate a third variant of a clutch release bearing device according to the invention, with a multipart cover ring element centered on the stationary bearing race, FIG. 4 an axial sectional representation to illustrate a fourth variant of a clutch release bearing device according to the invention with a cover ring element that is provided with an elastomeric sealing lip engaging in an inner opening of the second bearing race, FIG. 5 an axial sectional representation to illustrate a fifth variant, however, resembling the variant according to FIG. 4 of a clutch release bearing device according to the invention, FIG. 6 an axial sectional representation to illustrate a sixth variant of an release bearing according to the invention with a sealing cover ring element bearing positioned through a bearing carrier bushing, FIG. 7 an axial sectional representation to illustrate a seventh variant of a clutch release bearing device according to the invention, FIG. 8 an axial sectional representation to illustrate an eighth variant of a clutch release bearing device according to the invention.

The clutch release bearing device 1 represented in FIG. 1 comprises a first bearing race L1, which, in the exemplary embodiment shown here, represents the bearing race rotating around a bearing axis, and a rolling member race section B1 formed as a first external ring surface. The clutch release bearing device further comprises a second bearing race L2 that forms a second rolling bodies race section formed as an internal ring surface B2.

The clutch release bearing device further comprises rolling members W that are received in a raceway defined between the first bearing race L1 and the second bearing race L2 as well as a cage device K for guiding the rolling members W within the above-mentioned raceway space.

The clutch release bearing device is formed such that the first bearing race L1 and the second bearing race L2 surround one another in axial direction, partially overlapping, whereby the second bearing race L2 herewith surrounds the first bearing race L1.

On the second bearing race L2, a radial drawn-in ring wall RW is formed below the radial level of the first rolling members race section B1. This ring wall RW defines a bearing opening 0 whose diameter is smaller than the diameter of the rolling members race section B1. In the section of this ring wall RW, a sealing device 2 is provided, which serves as such to suppress the access of impurities to the internal bearing section, i.e. the rolling members' raceway space over a potential passage section formed between the two bearing races L1, L2.

The clutch release bearing device represented here is characterized in that the sealing device 2 comprises a ring element 1 that sits on an internal wall section I of the radial drawn-in ring wall RW of the second bearing race L2. In the exemplary embodiment shown here, this ring element 1 carries a sealing structure 3 that lies on an adjoining race section 14 of the first bearing race L1.

In the exemplary embodiment shown here, the ring element 1 comprises a metallic reinforcement ring 8 that rests directly on the above-mentioned internal wall section I of the drawn-in ring wall RW. On the metallic reinforcement ring 8, a sealing structure 3 formed by an elastomeric body is mounted, which forms a sealing lip 4 that rests on a race section 14 formed by an internal collar. This internal ring collar is formed by an external circumferential surface of the first bearing race L1.

In the exemplary embodiment shown here, the sealing device 2 comprises a sealing lip pair 3a with sealing lips 4, 5 whereby this sealing lip pair 3a, besides the above-mentioned, sealing lip 4 is radially spring-loaded from outside, and forms a sealing lip 5 (lightly) axially spring-loaded on the ring face of the first race 1. The two sealing lip edges 30 that contact the first bearing race L1 or at least approach the latter.

The sealing device 2 provided in the exemplary embodiment according to FIG. 1 comprises an elastomeric body—equipped with the sealing lip geometries—in combination with an additional sealing carrier 6. The acting sealing lip 4 executed here as main sealing lip is executed as a sliding sealing lip and seals radially on the race section 14 of the internal ring collar. The second sealing lip 5 is preferably formed as a non-contacting or only lightly contacting dust prevention sealing lip and functions as pre-sealing and keeps off coarse dirt from outside.

The sealing device 2 is pressed on the actual sealing carrier 6 when assembling the bearing, whereby a rubber-covered press seat section 7 of the sealing device 2 provided for it contributes besides the sealing effect also for an increased frictional closure for certain transmission of the sealing frictional torque. Preferably, a corresponding grooved surface is formed on the press seat section 7 and/or on the sealing carrier by what means the fixed seat of the seal is improved after pressing the same. Also further detailed geometries can be formed in this section, through which the sealing device 2 coupling with the second bearing race 2, i.e. with the drawn-in ring wall RW of the same, is improved.

Besides the reinforcing effect of the metal reinforcement 8, this also serves for the support during the pressing process, and as a limiting stop on the external ring 2, particularly on the external ring board formed by the drawn-in ring wall RW.

The sealing carriers 6 in the exemplary embodiment shown here are provided with an axially extending collar 10 that sits as such under a press seat or fixed seat in a boring 11 formed by the drawn-in ring wall RW. To avoid wear, the sealing carrier 6 is preferably heat-treated to increase hardness and particularly to reduce friction, it is equipped with a coating, for example a Mn-phosphate layer, at least in a contact section 12 in which a preload spring 13 sits.

Figure 2:
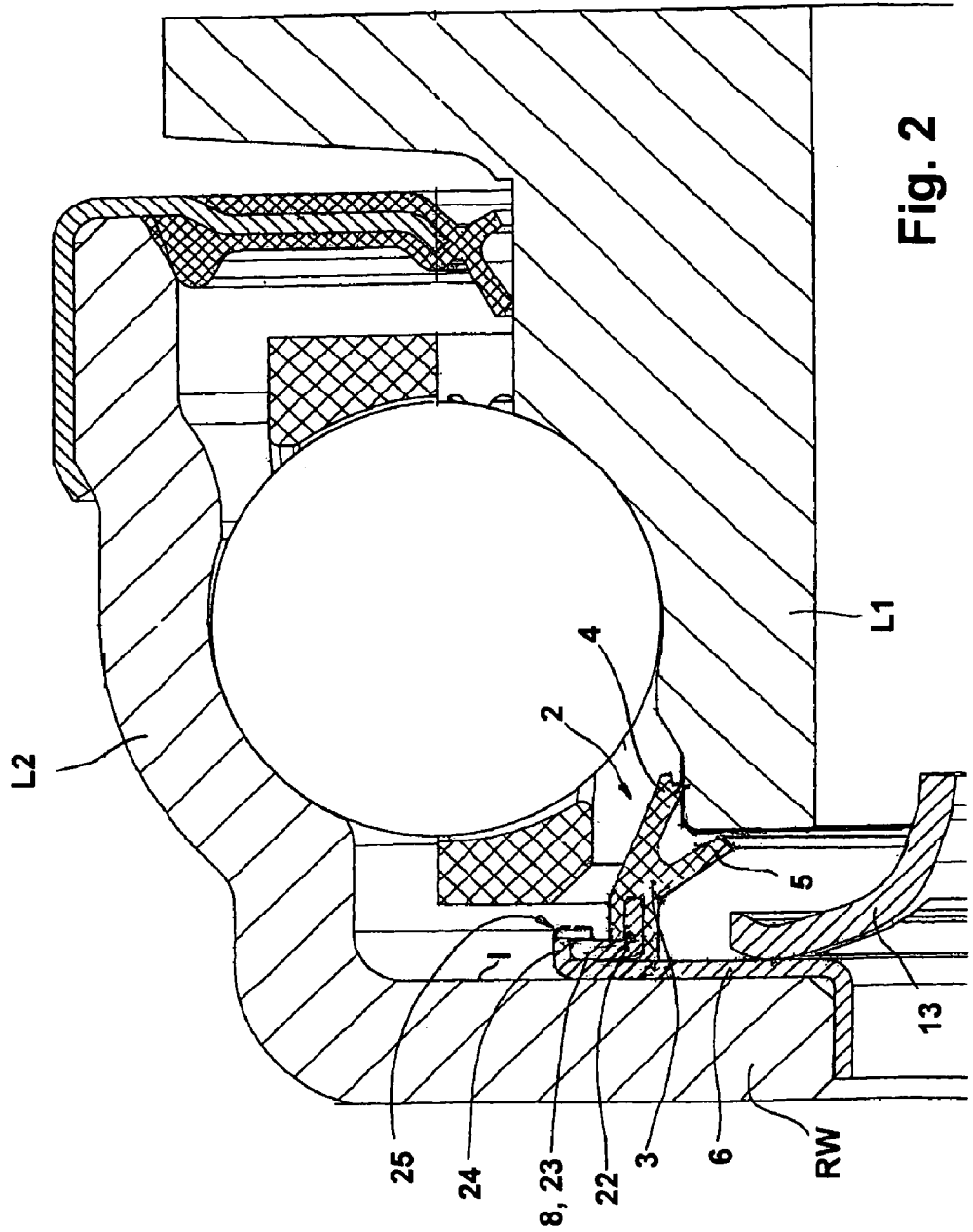

Advantages:
highly effective sliding seal
no centrifugal force influence, hence constant sealing friction
simple manufacture of seal and sealing carrier possible by separate functions
economical sealing device
improved sealing effect through initial sealing with dust lip
space-saving sealing arrangement
optimum, function-suited formation of contact section with respect to wear and friction reduction through suitable material pair
heat treatment and coating possible
formation of preload spring 13 as snap spring does not enable fixation of the bearing on a holding ring (not represented) on a slide-on sheath for a CSC mechanism or for fixing on a slide-on sheath for conventional release bearing designs In FIG. 2, a further variant of a clutch release bearing device according to the invention is represented, in which, in similarity to the exemplary embodiment according to FIG. 1, in axial direction the sealing device 2 sits on the inner wall surface I of the radial drawn-in ring wall RW. The sealing device 2 and/or the reinforcement ring 8 of the same comprise/s a radially extending limb 23. The external edge section of the limb 23 is surrounded by a ring edge section 24 of the sealing carrier 6.

The reinforcement ring 8 furthermore comprises a ring section 22 extending axially, which as such reinforces the sealing structure 3 made of an elastomeric material, and precisely positions the sealing lips 4, 5 formed by the latter with respect to the first bearing race L1. A radial and/or dovetailed joint of the end section 25 of the collar 24 overlapping the edge section of the reinforcement ring 24 increases the assembly certainty and the frictional transmission certainty of the frictional torque acting on the sealing device 2.

Figure 3:
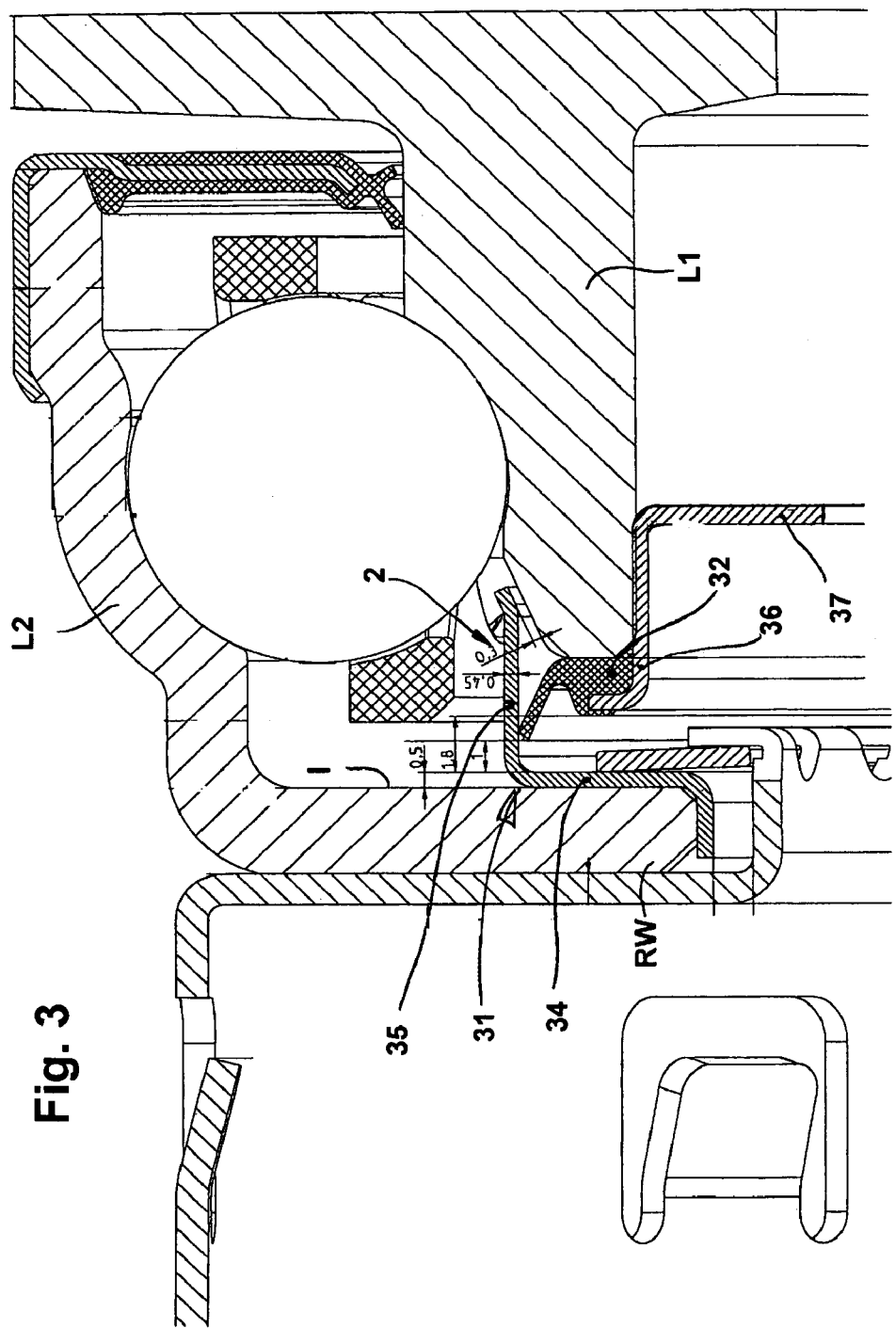

Advantages:
certain preassembly of the sealing ring on the sealing carrier 6 possible
otherwise as before In the exemplary embodiment shown in FIG. 3, the sealing device 2 comprises a ring 34 sitting on the internal wall section I of the radial drawn-in ring wall RW and that is angular in the cross-section as well as an elastomeric sealing ring 32 anchored in the rotating bearing race L1.

The clutch release bearing device shown in FIG. 3 is suitable, particularly, as a release bearing for CSC applications. The internal sealing device 2 realized here comprises the angular (cross-section) ring 34 supported axially on the second bearing race L2, and the revolving bearing race, i.e. the internal ring L1 of the fixed elastomeric sealing ring 32. The elastomeric sealing ring 32 comprises a reinforcement ring 36 and it is secured via this on the revolving bearing race L1. This security is provided here concretely because the reinforcement ring comprises a bushing section that sits in the internal boring section of the first bearing race L1. The elastomeric seal 32 sits on a ring face of the first bearing race L1 and is carried by the reinforcement ring 36.

The ring 34 shown here in an axial section is angular with respect to its cross-section and forms a sealing raceway with its collar 35 extending axially and overlapping the internal race L1 section. The end section, here visibly slightly bent and/or radially offset outwards, acts as a gap seal with grease-guiding function. As an initial seal, it is proposed, optionally at the end of the axially extending collar of the reinforcement ring 36, to form an ring flange 37 protruding radial inside the bearing boring to form an ring flange 37.

Figure 4:
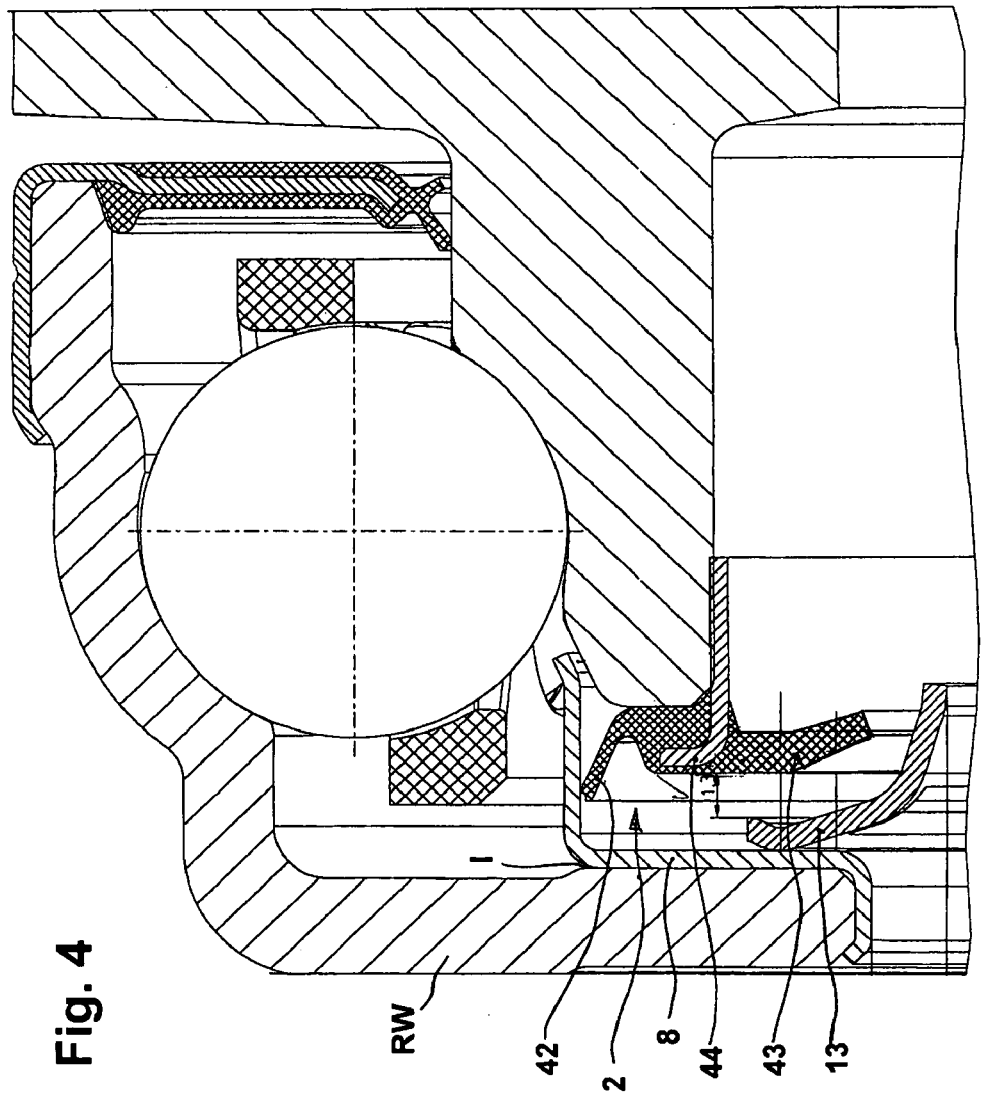

Advantages:
centrifugal-force reinforced sealing effect of the sliding sealing lip and thus highly effective sealing over the entire operation range
simple assembly of the sealing device in an automated assembly line
extremely space-saving sealing arrangement
advantageous formation of the contact section with respect to friction reduction through suitable material pairing possible
heat treatment and coating of the sealing carrier 34 possible In FIG. 4, a further embodiment according to the invention of a clutch release bearing device is represented. In this exemplary embodiment, the sealing device 2 comprises an additional initial seal 43 besides the sealing lip 42 that together with the sliding sealing lip 42 is vulcanized on reinforcement-ring 44. In addition, in this exemplary embodiment, the ring element 8 interacting with the sealing lip 42 is axially positioned through the internal wall section I of the drawn-in ring wall RW Advantages:
lesser parts in comparison with the embodiment according to FIG. 3 through the omission of separate rings as initial seal
fixing possibilities as described with respect to FIG. 3

Figure 5:
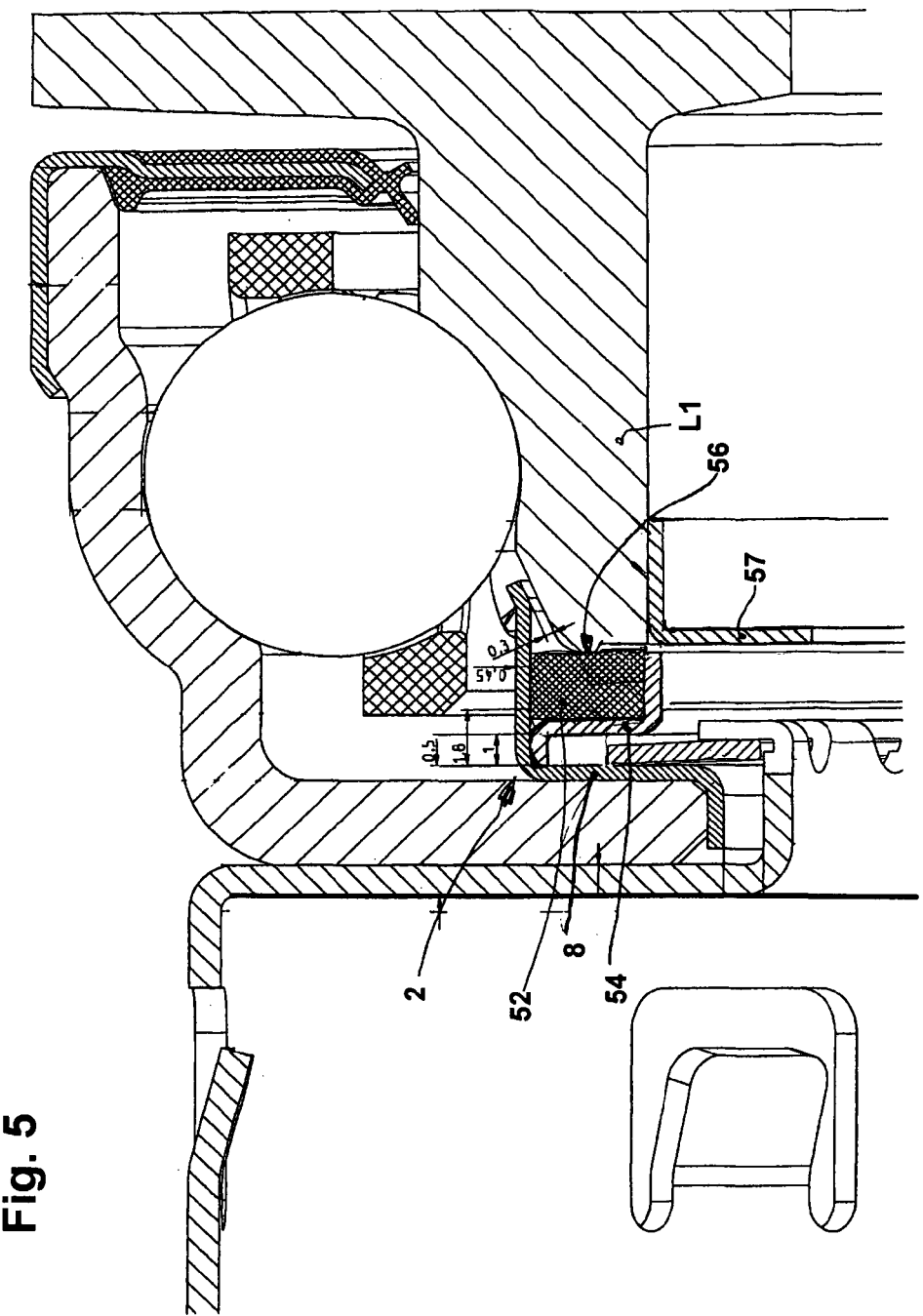

In FIG. 5, a further exemplary embodiment of a clutch release bearing device according to the invention is represented, which particularly can find application as a CSC-release bearing. The release bearing comprises an internal sealing device 2 that comprises a sealing material layer made of a fleece ring 52. The fleece ring 52 is disposed in the boring section of the sealing carrier 8 and can be stabilized, as represented here, additionally with a holding ring 54.

To reduce friction, the ring section of the first bearing race L1 dipped in the sealing device 2 is preferably formed conical-shaped as depicted. The sealing effect of the sealing device 2 shown here is formed preferably raised in that in the ring face section of the first bearing race a circumferential nose 56 is formed, which as such sits on the fleece ring 52.

As an initial seal, an angular ring 57 is provided in the exemplary embodiment shown here, which is pressed into the boring of the first bearing race L1. The fleece ring 52 is preferably made of fleece materials such as PE as well as PE with PTFE fabric inclusions.

Figure 6:
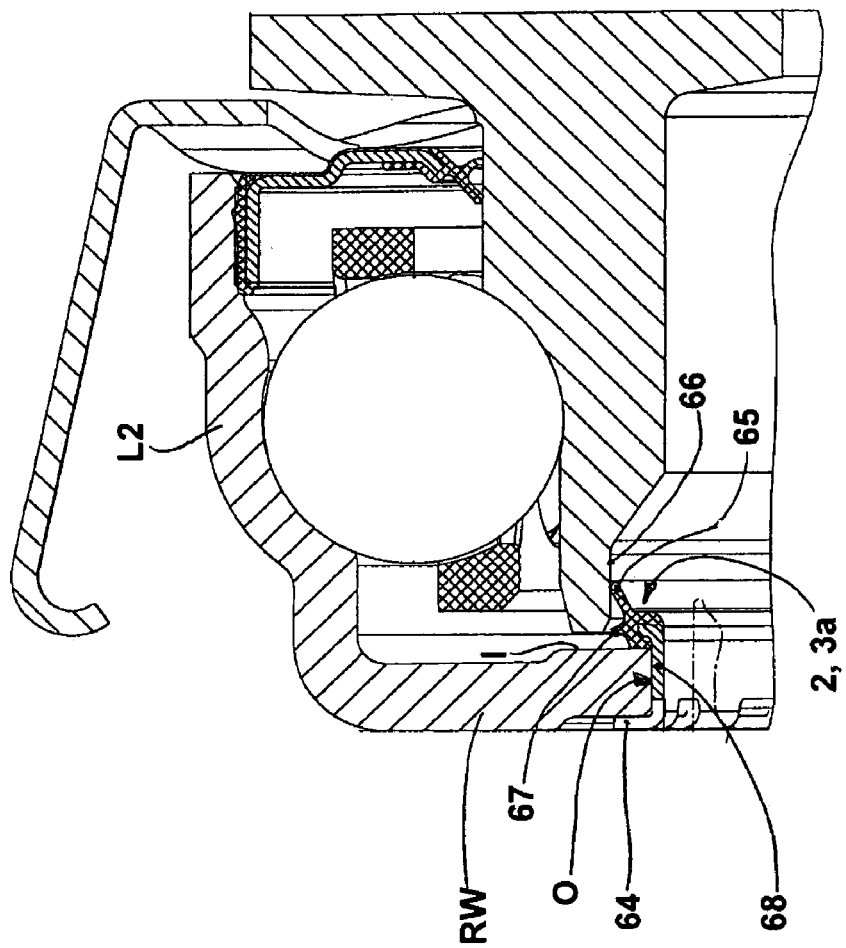

Advantages:
parts for the sealing device are easy to produce
cheap fleece ring
low friction of the fleece ring seal, particularly, when PTFE material is used
easy assembly
particularly, effective initial sealing In the exemplary embodiment 6 represented in FIG. 6 of a release bearing, a sealing device 2 is provided, which is centered in the boring 0 of the drawn-in ring wall section RW of the external bearing race L2 and is fixed over the flange knuckle 64 of the reinforcement 68 axially fixed in a form-closed manner. The sealing is provided via the main sealing lip 65 in contact with the internal ring boring 66. An initial sealing lip 67, formed here as a gap seal, serves for retaining lubricant in the exemplary embodiment shown here. The sealing device 2 here also is axially positioned through the internal wall section I. The internal diameter of the boring 0 is dimensioned such that, with respect to the internal ring boring of the first bearing race L1, a radial offset arises. In this offset section, the elastomeric structure of the sealing device 2 is contained. The sealing lips 65 and 67 project from the sealing carrier 68 radially outwards. The sealing lip 65 contacts an internal circumferential surface of the first bearing race L1.

Figure 7:
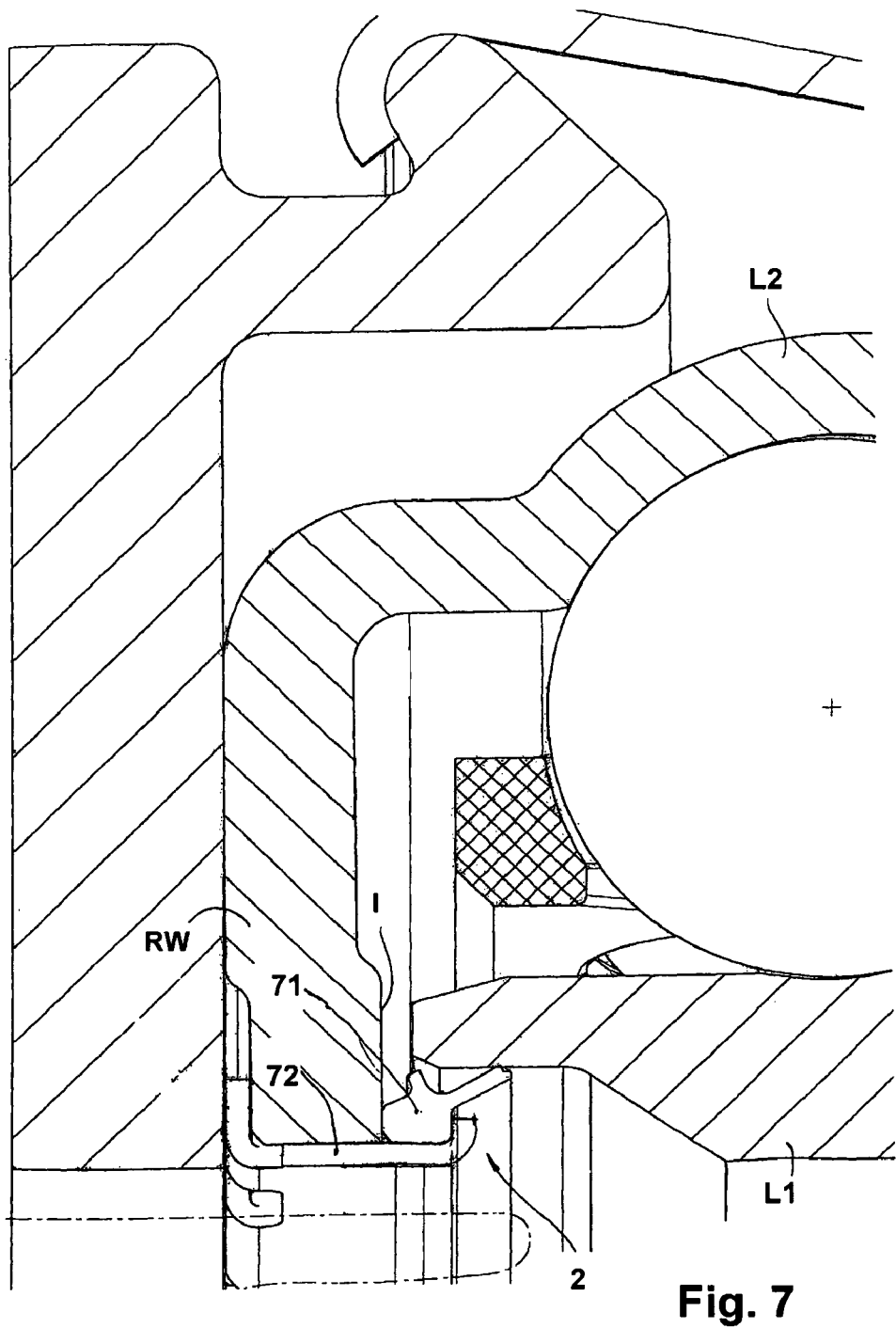

Advantages:
smallest possible space requirement
no impairment of the sealing effect through centrifugal force effects
simple manufacture and assembly of the seal
economical seal In FIG. 7, a seventh exemplary embodiment of a clutch release bearing device according to the invention is represented. Deviating from the preceding variant described in connection with FIG. 6, the sealing device 2 in this case comprises an inserted elastomeric part 71. The elastomeric part 71 is fixed by means of a holding ring 72. The elastomeric part 71 is positioned axially through the internal wall I of the drawn-in ring wall RW.

Advantages:
particularly economical
otherwise as above

Figure 8:
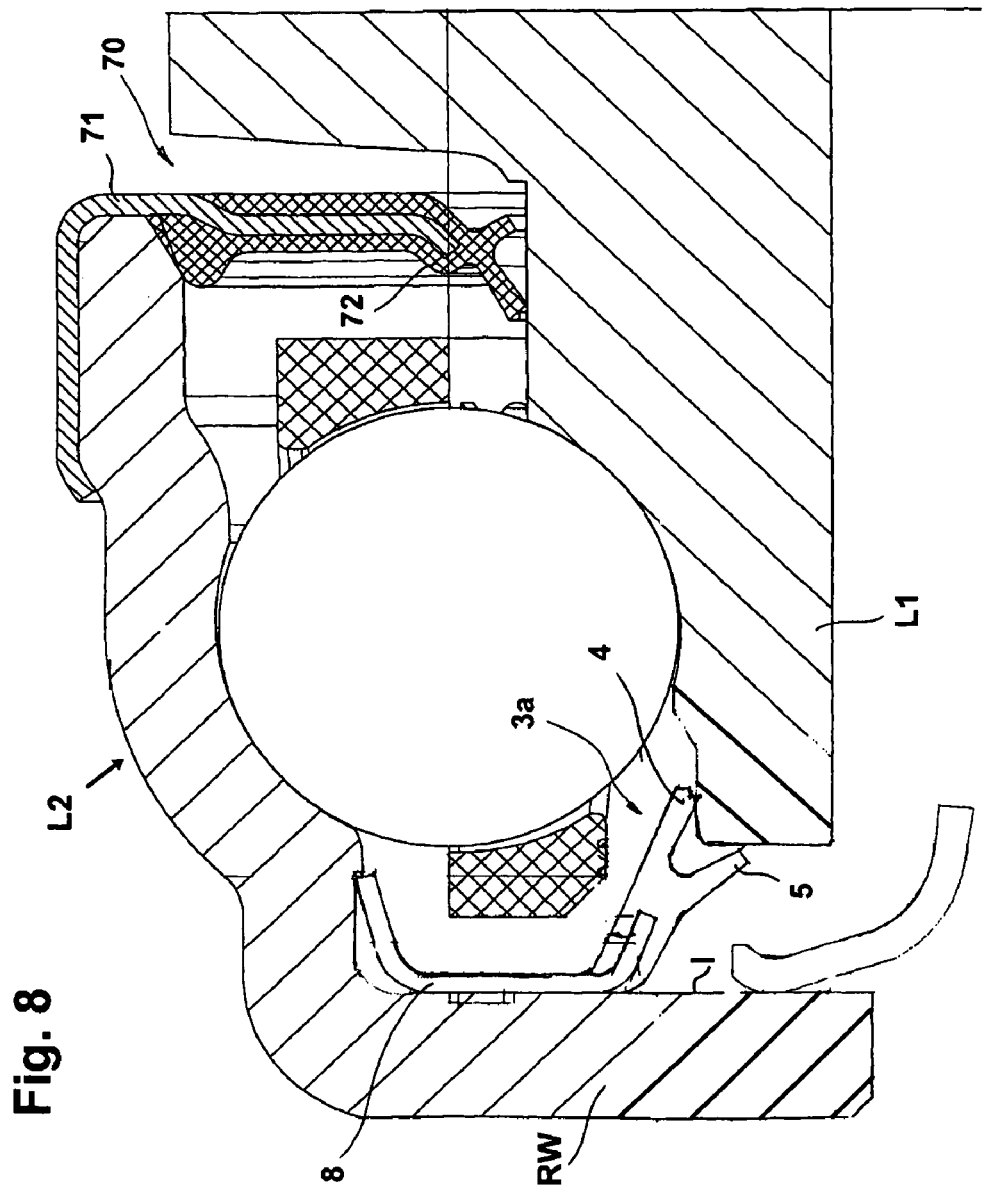

In FIG. 8, an eighth variant of a clutch release bearing device according to the invention is represented. In this eighth variant, in similarity to the exemplary embodiment according to FIG. 1, a reinforcement ring 8 that carries a sealing lip device 3a with a sealing lip pair is positioned on the internal wall section I of the radial drawn-in ring wall RW. The sealing lip device 3a is formed in the same manner as in the exemplary embodiment according to FIG. 1, radially from outside, so that the first sealing lip 4 springs on an external circumferential section of the first bearing race 1. The second sealing lip 5 of the sealing lip pair lies on a ring face of the first bearing race L1.

In the above-described clutch release bearing devices according to the invention, besides the particularly effective seal of the distant race gap section between both bearing races L1 and L2 and/or the first bearing race L1 and the radial inwardly drawn-in ring wall section RW, also the clutch-adjoining race gap—between both bearing races L1, L2 is sealed. In the exemplary embodiment shown here, a sealing ring 70 is placed on the second bearing race L2, which comprises a reinforcement body 71 and an elastomeric structure 72 vulcanized on the former. That comprises the vulcanized elastomeric structure 72 as shown here. In the exemplary embodiment shown here, the elastomeric structure 72 is executed as a double sealing lip and sits on an external circumferential section of the first bearing race L1 as a sliding seal.

What is claimed is:

1. A clutch release bearing device comprising:
a first bearing race representing a bearing race revolving around a bearing axis and forming a first rolling member race section formed as an external ring surface,
a second bearing race forming a second rolling members race section formed as an internal ring surface,
rolling bodies contained in a raceway space defined between the first bearing race and the second bearing race,
a cage guiding the rolling bodies within the raceway space,
the first bearing race and the second bearing race overlapping one another in an axial direction, and the second bearing race externally surrounding the first bearing race,
on the second bearing race, a radial drawn-in ring wall being formed below a radial level of the first rolling member race section, and
a sealing device for suppressing penetration of dirt into the raceway space, as well as for suppressing escape of lubricant through a potential passage section formed between both the first and second bearing races,
the sealing device comprising a ring element sitting on an internal wall section of the radial drawn-in ring wall of the second bearing race,
wherein the ring element comprises a sealing structure made of an elastomeric material and forming a sealing lip device,
wherein the sealing lip device comprises a sealing lip pair with a first sealing lip and a second sealing lip, the first sealing lip being a main sealing lip that is radially spring loaded against an external circumferential section of the first bearing race and the second sealing lip formed as a non-contacting or only lightly contacting dust prevent sealing lip that functions as a pre-sealing lip at a race section formed as a ring face of the first bearing race.

2. The clutch release bearing device as recited in claim 1 wherein the sealing device lies on an adjoining race section of the first bearing race.

3. The clutch release bearing device as recited in claim 1 wherein the ring element comprises a steel ring.

4. The clutch release bearing device as recited in claim 3 wherein the steel ring extends through a bearing opening defined by the drawn-in ring wall.

5. The clutch release bearing device as recited claim 1 wherein at least a sealing lip of the sealing lip device lies on a race section formed as internal circumferential surface of the first bearing race.

6. A method for the production of a clutch release bearing device as recited in claim 1 comprising: preceding the insertion of the first bearing race into the second bearing race, equipping the second bearing race with the sealing device in that at least the ring element of the sealing device is fitted on the internal surface section of the drawn-in ring wall from the application direction of the first bearing race.

7. The clutch release bearing device as recited in claim 1 further comprising an additional sealing carrier, the sealing lip device being pressed in between the ring element and the additional sealing carrier.

8. The clutch release bearing device as recited in claim 7 wherein the additional sealing carrier includes an axially extending collar sitting in a boring formed by the radial drawn-in ring wall of the second bearing race.

9. The clutch release bearing device as recited in claim 7 further comprising a preload spring preloading the additional sealing carrier against the internal wall section of the radial drawn-in ring wall.

10. The clutch release bearing device as recited in claim 9 wherein the additional sealing carrier includes a friction reducing coating in at least a contact section in which the preload spring sits.

11. The clutch release bearing device as recited in claim 10 wherein the friction reducing coating is a Mn-phosphate layer.

* * * * *